United States Patent
Daniel et al.

(10) Patent No.: US 10,552,542 B1
(45) Date of Patent: *Feb. 4, 2020

(54) TECHNIQUES FOR GRAPH BASED NATURAL LANGUAGE PROCESSING

(71) Applicant: Facebook, Inc., Menlo Park, CA (US)

(72) Inventors: Robert Franklin Daniel, Redwood City, CA (US); Akash Guarav Gupta, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,282

(22) Filed: May 1, 2019

Related U.S. Application Data

(63) Continuation of application No. 16/110,009, filed on Aug. 23, 2018, now Pat. No. 10,318,638, which is a continuation of application No. 15/729,942, filed on Oct. 11, 2017, now Pat. No. 10,095,687, which is a continuation of application No. 15/411,319, filed on Jan. 20, 2017, now Pat. No. 9,817,815, which is a continuation of application No. 14/585,830, filed on Dec. 30, 2014, now Pat. No. 9,589,305.

(51) Int. Cl.
| | |
|---|---|
| *G06F 17/27* | (2006.01) |
| *G06F 16/9032* | (2019.01) |
| *G06F 16/9535* | (2019.01) |
| *G06F 16/901* | (2019.01) |
| *G10L 15/22* | (2006.01) |
| *G06Q 50/00* | (2012.01) |

(52) U.S. Cl.
CPC ...... *G06F 17/2785* (2013.01); *G06F 16/9024* (2019.01); *G06F 16/90332* (2019.01); *G06F 16/9535* (2019.01); *G06F 17/277* (2013.01); *G06F 17/278* (2013.01); *G06Q 50/01* (2013.01); *G10L 15/22* (2013.01); *G10L 2015/223* (2013.01)

(58) Field of Classification Search
CPC .... G06F 17/2827; G06F 17/289; G06F 17/30; G06F 17/274; G06Q 50/01
USPC .......................................................... 704/9
See application file for complete search history.

(56) References Cited

U.S. PATENT DOCUMENTS

| | | | |
|---|---|---|---|
| 7,293,041 B2 * | 11/2007 | Such | G06F 9/4492 |
| 9,424,344 B2 * | 8/2016 | Kothuvatiparambil | G06F 16/24578 |
| 2015/0286643 A1 * | 10/2015 | Kumar | G06F 16/9535 707/728 |

* cited by examiner

*Primary Examiner* — Charlotte M Baker

(57) ABSTRACT

Techniques for graph based natural language processing are described. In one embodiment an apparatus may comprise a client service component operative on the processor circuit to receive a natural language user request from a device and to execute the natural language user request based on matched one or more objects and a social object relation component operative on the processor circuit to match the natural language user request to the one or more objects in an object graph, the object graph comprising token mappings for objects within the object graph, the token mappings based on data extracted from a plurality of interactions by a plurality of users of the network system, wherein the one or more objects are matched with the natural language user request based on the token mappings. Other embodiments are described and claimed.

20 Claims, 12 Drawing Sheets

600

- Receive a natural language user request on a device.
  602

- Relate the natural language user request to one or more local objects, the local objects stored on the device.
  604

- Determine a confidence level for each of the one or more local objects.
  606

- Determine a low-confidence local object, wherein the confidence level for the low-confidence local object is less than a confidence threshold.
  608

- Transmit a network query to a network system, the network query requesting that the network system match the natural language user request against an object graph.
  610

- Receive a remote object to replace the low-confidence local object from the network system in response to the network query, the remote object represented within the object graph.
  612

- Execute the natural language user request based on the remote object.
  614

```
Receive a natural language user request from a device.
702
```

```
Match the natural language user request to one or more objects
in an object graph, the object graph comprising token mappings
for objects within the object graph, the token mappings based on
data extracted from a plurality of interactions by a plurality of
users of the network system, wherein the one or more objects are
matched with the natural language user request based on the
token mappings.
704
```

```
Execute the natural language user request based on the matched
one or more objects.
706
```

*FIG. 7*

TECHNIQUES FOR GRAPH BASED NATURAL LANGUAGE PROCESSING

This application is a continuation of, claims the benefit of and priority to previously filed U.S. patent application Ser. No. 16/110,009, which is a continuation of, claims the benefit of and priority to previously filed U.S. patent application Ser. No. 15/729,942 filed Oct. 11, 2017, now issued U.S. Pat. No. 10,095,687, which is a continuation of, claims the benefit of and priority to previously filed U.S. patent application Ser. No. 15/411,319 filed Jan. 20, 2017, now issued U.S. Pat. No. 9,817,815, which is a continuation of, claims the benefit of and priority to previously filed U.S. patent application Ser. No. 14/585,830 filed Dec. 30, 2014, now issued U.S. Pat. No. 9,589,305, which are hereby incorporated by reference in their entireties.

BACKGROUND

Natural language processing (NLP) may be desired to ease and make more intuitive for users the process of interacting with computers. If commands, requests, and other input to a computer program could be entered using the same language as might be used when speaking to another human being, then this would lessen the burden on the human user of learning an interface for the program. Rather than a human accommodating the program by learning how to interact with it, the program may accommodate the human by interacting with them the way humans interact with each other.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for graph based natural language processing. Some embodiments are particularly directed for graph based natural language processing leveraging language knowledge derived from social media interactions. In one embodiment, for example, an apparatus may comprise a client service component operative on the processor circuit to receive a natural language user request from a device and to execute the natural language user request based on matched one or more objects and a social object relation component operative on the processor circuit to match the natural language user request to the one or more objects in an object graph, the object graph comprising token mappings for objects within the object graph, the token mappings based on data extracted from a plurality of interactions by a plurality of users of the network system, wherein the one or more objects are matched with the natural language user request based on the token mappings. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a first logic flow for the system of FIG. 1.

FIG. 7 illustrates an embodiment of a second logic flow for the system of FIG. 1.

DETAILED DESCRIPTION

Figure 1:
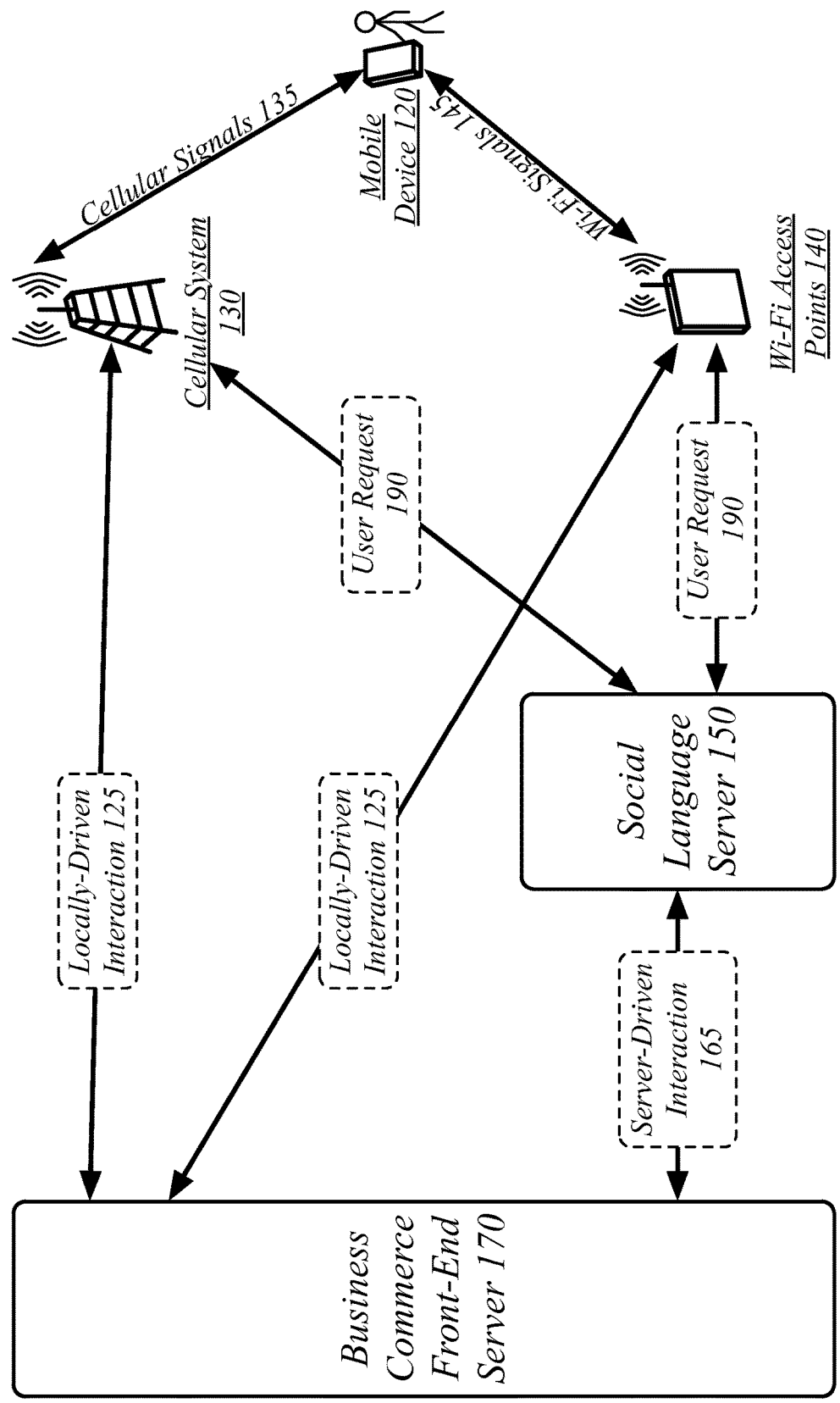
FIG. 1 illustrates an embodiment of a natural language request system.

Various embodiments are directed to techniques to use the knowledge about natural language that may be inferred from social media interactions to perform natural language requests on behalf of a user. A social-networking system may contain a representation of individual people, business entities, items of commerce (e.g., products, services), and other things. Users of the social-networking system may interact with and reference these representations using natural language. These interactions and references may be used to infer what natural language tokens are associated in common usage with the referents of the representations. The understanding of the relationship between natural language tokens and things via the representations of the things within a social-networking system may then be used to interpret a user request expressed in natural language and thereby used in the performance of a natural-language request. Because the natural language learning may be performed on a data set generated by user of the social-networking system as part of their normal interaction with the social-networking system, a vast amount of data about the use of natural language may be automatically generated. As a result, the embodiments can improve the affordability of natural language learning, the performance of natural language processing (NLP), and the ease of use of software that may benefit from interactions being performed using natural language.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a natural language request system 100. In one embodiment, the natural language request system 100 may comprise a computer-implemented system having software applications comprising one or more components. Although the natural language request system 100 shown in FIG. 1 has a limited number of elements in a certain topology, it may be appreciated that the natural language request system 100 may include more or less elements in alternate topologies as desired for a given implementation.

A mobile device 120 may both be the preferred interface to an NLP interface with a computer system and a device for which an NLP interface is particularly preferable. The mobile device 120 may have access to significant information about a user (e.g., a current location, a location history, contacts) that are not available or not typically associated with a stationary device such as a personal computer (PC). The mobile device 120 may have limited screen space and limited input methods—a lack of a full keyboard, etc.—that restrict the creation of both intuitive and powerful visual user interfaces that represent programs' abilities. The mobile device 120 may therefore be improved by using a general interface based on text or voice commands that may be expressed in natural language.

Natural language commands may be particularly appropriate for the input of tasks oriented towards light-weight interactions with businesses. For example, the editing of a lengthy document may be sufficiently complex as to justify the use of a complex text editing interface. In contrast, requests for simple business interactions may be simple enough to express in short natural language requests and fulfilled automatically on behalf of the user. Purchasing movie tickets, reserving a table at a restaurant, and arranging a cab ride, for example, may depend on only a few inputs: a number of people, an approximate time, and a location. In particular, the most complex part of processing these requests may consist of determining what type of provider and what specific provider of that type are appropriate for the requests. A request for "Two tickets to see The Godfather around 7:00 pm" may be served according to an existing electronic interface for purchasing movie tickets once a NLP system determines that "The Godfather" is a movie and what sorts of business provide tickets to see movies. As social media is frequently used in the discussion of every day business transactions and media consumption—eating at restaurants, seeing films, etc.—the language examples provided by a social-networking system may be well-suited to handling these sorts of requests.

A mobile device 120 may communicate with server devices using wireless transmissions to exchange network traffic. Exchanging network traffic, such as may be included in the performance of a user request 190, may comprise transmitting and receiving network traffic via a network interface controller (NIC). A NIC comprises a hardware component connecting a computer device, such as mobile device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The mobile device 120 may comprise a cellular interface for access to a cellular system 130 and a Wi-Fi interface for access to Wi-Fi access points 140. The mobile device 120 may access a cellular system 130 using cellular signals 135. The cellular system 130 may be a cellular network including data access. The mobile device 120 may access one or more Wi-Fi access points 140 using Wi-Fi signals 145. Wi-Fi access points 140 may be provided by a plurality of different operators. Some of the Wi-Fi access points 140 may be personal in nature, such as a home Wi-Fi network operated by the user of mobile device 120 based on a domestic Internet connection. Some of the Wi-Fi access points 140 may be provided by business entities providing free, complimentary, or pay Wi-Fi access in the public sphere.

A mobile device 120 may be capable of receiving a natural language user request 190, determining a solution to the user request 190, and performing the solution to execute the user request 190 using a local-driven interaction 125 with a business commerce front-end server 170. The business commerce front-end server 170 may be a server providing automated access to user devices for the performance of commerce with the user. For example, the business commerce front-end server 170 for a theater chain or movie ticket service may provide an API for purchasing movie tickets. The business commerce front-end server 170 for a restaurant or restaurant-table reservation service may provide an API for reserving tables. The business commerce front-end server 170 for a taxi company may provide an API for scheduling rides.

In some cases, the mobile device 120 may be capable of interpreting the user request 190 based solely on data stored locally to the mobile device 120. This data may include information generated on the device (e.g., a location of the mobile device 120) and may also include knowledge received from a social language server 150 representing relationships between natural language tokens and objects representing business, products, services, and other entities that may be cached on the mobile device 120. In these cases the user request 190 may remain local to the device with the mobile device 120 performing a locally-driven interaction 125 with the business commerce front-end server 170.

In other cases, the mobile device 120 may be better served by using natural language data and entity data stored on or accessible to a social language server 150. The social language server 150 may store or have access to a considerably larger amount of data related to businesses, products, and services and how those businesses, products, and services are referred to in natural language. As such, the user request 190 may be forwarded to the social language server 150 for interpretation and the creation of a solution. In some embodiments, the determined solution may be returned to the mobile device 120 to allow the mobile device 120 to perform a locally-driven interaction 125 executing the user request 190 via the determined solution. In other embodiments, the determined solution may be performed by the social language server 150 by performing a server-driven interaction 165 executing the user request 190.

In either embodiment, in various circumstances the mobile device 120 may use either or both of the cellular system 130 and the Wi-Fi access points 140 to communicate with the social language server 150. Similarly, either or both of the cellular system 130 and the Wi-Fi access points 140 may be used for interactions between the mobile device 120 and the business commerce front-end server 170.

The mobile device 120 and/or the social language server 150 may use knowledge generated from interactions in a social-networking system. As such, natural language request system 100 may include an authorization server (or other suitable component(s)) that allows users to opt in to or opt out of having their actions logged by natural language request system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of natural language request system 100 and other elements of a social-networking system through blocking, data hashing, anonymization, or other suitable techniques as appropriate. For example, while interactions between users of a social-networking system and the social-networking system may be used to learn natural language relationships, these interactions may be anonymized prior to or as part of the learning process.

Figure 2:
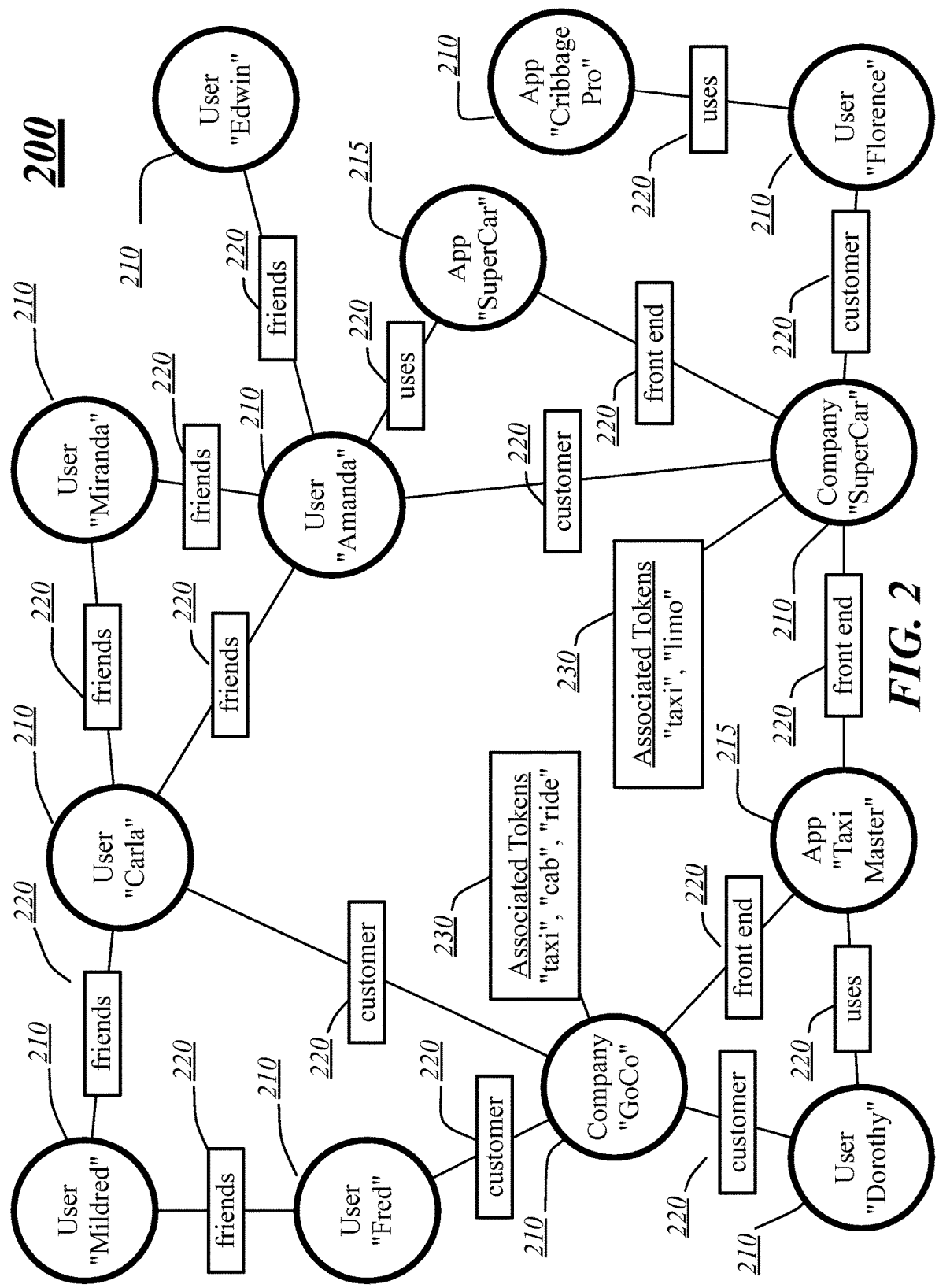
FIG. 2 illustrates an embodiment of an object graph.

FIG. 2 illustrates an embodiment of an object graph 200. In particular embodiments, a social-networking service may store one or more object graphs in one or more data stores. In particular embodiments, object graph 200 may include multiple entity nodes 210. Object graph 200 may include multiple edges 220 connecting the nodes, each of which may represent a relationship and be associated with a descriptor for that relationship. Object graph 200 may include multiple language token tags 230 indicating tokens associated with an entity. In particular embodiments, a social-networking service, client system, third-party system, or any other system or device may access object graph 200 and related social-graph information for suitable applications. The nodes and edges of object graph 200 may be stored as data objects, for example, in a data store (such as a social-graph database). Such a data store may include one or more searchable or queryable indexes of nodes or edges of object graph 200.

In particular embodiments, a entity node 210 may correspond to a user of the social-networking service. As an example and not by way of limitation, a user may be an individual (human user), an entity (e.g., an enterprise, business, or third-party application), or a group (e.g., of individuals or entities) that interacts or communicates with or over the social-networking service. In particular embodiments, when a user registers for an account with the social-networking service, the social-networking service may create a entity node 210 corresponding to the user, and store the entity node 210 in one or more data stores. Users and entity nodes 210 described herein may, where appropriate, refer to registered users and entity nodes 210 associated with registered users. In addition or as an alternative, users and entity nodes 210 described herein may, where appropriate, refer to users that have not registered with the social-networking service. In particular embodiments, a entity node 210 may be associated with information provided by a user or information gathered by various systems, including the social-networking service. As an example and not by way of limitation, a user may provide their name, profile picture, contact information, birth date, sex, marital status, family status, employment, education background, preferences, interests, or other demographic information. In particular embodiments, a entity node 210 may be associated with one or more data objects corresponding to information associated with a user. In particular embodiments, a entity node 210 may correspond to one or more webpages.

In particular embodiments, a concept node 215 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking service or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 215 may be associated with information of a concept provided by a user or information gathered by various systems, including the social-networking service. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 215 may be associated with one or more data objects corresponding to information associated with concept node 215. In particular embodiments, a concept node 215 may correspond to one or more webpages.

In particular embodiments, a node in social graph 210 may represent or be represented by a webpage (which may be referred to as a "profile page"). Profile pages may be hosted by or accessible to the social-networking service. Profile pages may also be hosted on third-party websites associated with a third-party server. As an example and not by way of limitation, a profile page corresponding to a particular external webpage may be the particular external webpage and the profile page may correspond to a particular concept node 210. Profile pages may be viewable by all or a selected subset of other users. As an example and not by way of limitation, a entity node 210 may have a corresponding user-profile page in which the corresponding user may add content, make declarations, or otherwise express himself or herself. As another example and not by way of limitation, a concept node 215 may have a corresponding concept-profile page in which one or more users may add content, make declarations, or express themselves, particularly in relation to the concept corresponding to concept node 215.

In particular embodiments, a concept node 215 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking service a message indicating the user's action. In response to the message, the social-networking service may create an edge (e.g., an "eat" edge) between a entity node 210 corresponding to the user and a concept node 215 corresponding to the third-party webpage or resource and store edge 220 in one or more data stores.

In particular embodiments, a pair of nodes in object graph 200 may be connected to each other by one or more edges 220. An edge 220 connecting a pair of nodes may represent a relationship between the pair of nodes. In particular embodiments, an edge 220 may include or represent one or more data objects or attributes corresponding to the relationship between a pair of nodes. As an example and not by way of limitation, a first user may indicate that a second user is a "friend" of the first user. In response to this indication, the social-networking service may send a "friend request" to the second user. If the second user confirms the "friend request," the social-networking service may create an edge 220 connecting the first user's entity node 210 to the second user's entity node 210 in object graph 200 and store edge 220 as social-graph information in one or more data stores. In the example of FIG. 2, object graph 200 includes an edge 2200 indicating a friend relation between entity nodes 210 of user "Amanda" and user "Edwin" and an edge indicating a friend relation between entity nodes 210 of user "Fred" and user "Mildred." Although this disclosure describes or illustrates particular edges 220 with particular attributes connecting particular entity nodes 210, this disclosure contemplates any suitable edges 220 with any suitable attributes connecting user nodes 200. As an example and not by way of limitation, an edge 220 may represent a friendship, family relationship, business or employment relationship, customer relationship, user relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in object graph 200 by one or more edges 220.

Figure 11:
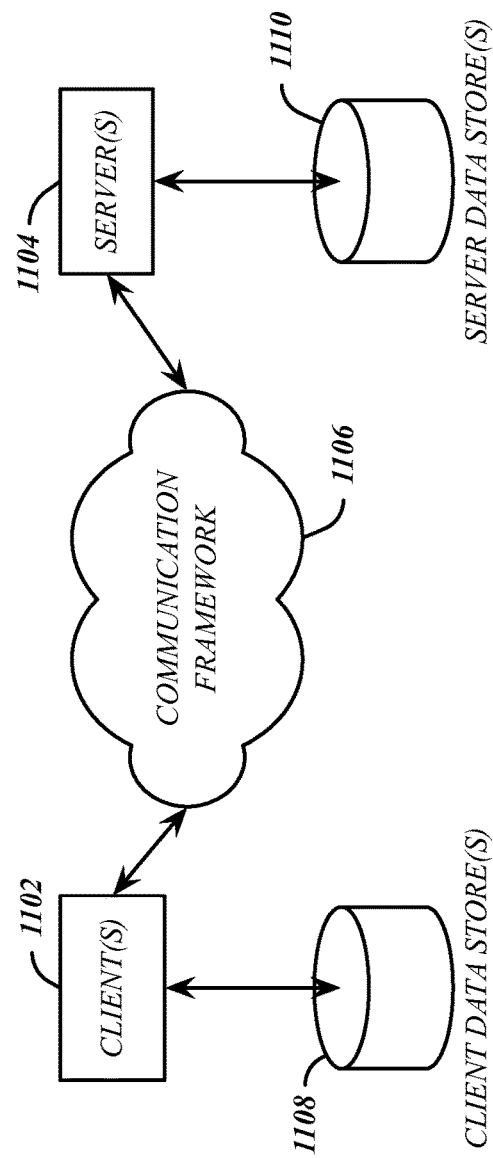
FIG. 11 illustrates an embodiment of a communications architecture.

In particular embodiments, an edge 220 between a entity node 210 and a concept node 215 may represent a particular action or activity performed by a user associated with entity node 210 toward a concept associated with a concept node 215. As an example and not by way of limitation, as illustrated in FIG. 11, a user may "like," "attended," "played," "listened," "cooked," "worked at," "watched," or "used" a concept, each of which may correspond to a edge type or subtype. A concept-profile page corresponding to a concept node 215 may include, for example, a selectable "check in" icon (such as, for example, a clickable "check in" icon) or a selectable "add to favorites" icon. Similarly, after a user clicks these icons, the social-networking service may create a "favorite" edge or a "check in" edge in response to a user's action corresponding to a respective action. As another example and not by way of limitation, a user (user "Amanda") may reserve a ride using a particular application (SuperCar, an illustrative mobile application for a taxi company SuperCar). In this case, the social-networking service may create a "uses" edge 220 (as illustrated in FIG. 2) between entity nodes 210 corresponding to the user and concept nodes 215 corresponding to the application to indicate that the user listened used the application. Although this disclosure describes particular edges 220 with particular attributes connecting entity nodes 210 and concept nodes 215, this disclosure contemplates any suitable edges 220 with any suitable attributes connecting entity nodes 210 and concept nodes 215. Moreover, although this disclosure describes edges between a entity node 210 and a concept node 215 representing a single relationship, this disclosure contemplates edges between a entity node 210 and a concept node 215 representing one or more relationships. As an example and not by way of limitation, an edge 220 may represent both that a user likes and has used a particular concept. Alternatively, another edge 220 may represent each type of relationship (or multiples of a single relationship) between a entity node 210 and a concept node 215.

In particular embodiments, the social-networking service may create an edge 220 between a entity node 210 and a concept node 215 in object graph 200. As an example and not by way of limitation, a user viewing a concept-profile page (such as, for example, by using a web browser or a special-purpose application hosted by the user's client system) may indicate that he or she likes the concept represented by the concept node 215 by clicking or selecting a "Like" icon, which may cause the user's client system to send to the social-networking service a message indicating the user's liking of the concept associated with the concept-profile page. In response to the message, the social-networking service may create an edge 220 between entity node 210 associated with the user and concept node 215, as illustrated by "like" edge 220 between the user and concept node 215. In particular embodiments, the social-networking service may store an edge 220 in one or more data stores. In particular embodiments, an edge 220 may be automatically formed by the social-networking service in response to a particular user action. As an example and not by way of limitation, if a first user uploads a picture, watches a movie, or listens to a song, an edge 220 may be formed between entity node 210 corresponding to the first user and concept nodes 215 corresponding to those concepts. Although this disclosure describes forming particular edges 220 in particular manners, this disclosure contemplates forming any suitable edges 220 in any suitable manner.

In particular embodiments, associated tokens 230 may be associated with nodes. A token being associated with an entity node 210 or concept node 215 may indicate that the token describes the node. A node may be described as to the products it may provide, the services it may provide, or any other word indicating something that the entity represented by the node may provide. A node may be associated with a token comprise any word or words used with reference to the node. For example, an entity node 210 for a company "GoCo" providing taxi service may be described with the tokens "taxi," "cab," or "ride." The association of a token with a entity node 210 may be assigned by an administrator to describe the entity node 210. For instance, an administrator may create or manage a page for the GoCo taxi company and assign the token "taxi" to the entity node 210. Alternatively or additionally, the association of a token with an entity node 210 may be assigned through machine learning based on user interactions with the social networking service. For instance, users may comment on the GoCo company—such as in messaging conversation or on a page for the company—with sentences such as "Got a great ride from GoCo," "First ride with GoCo went smoothly," and other instances of the word "ride" being used in conjunction with "GoCo," promoting the natural language request system 100 to learn that the GoCo company is associated with the concept of a "ride" as represented by the token "ride." Thereafter, the performance of requests containing the word "ride" may be based on information from the entity object 210 for the GoCo company.

Figure 3:
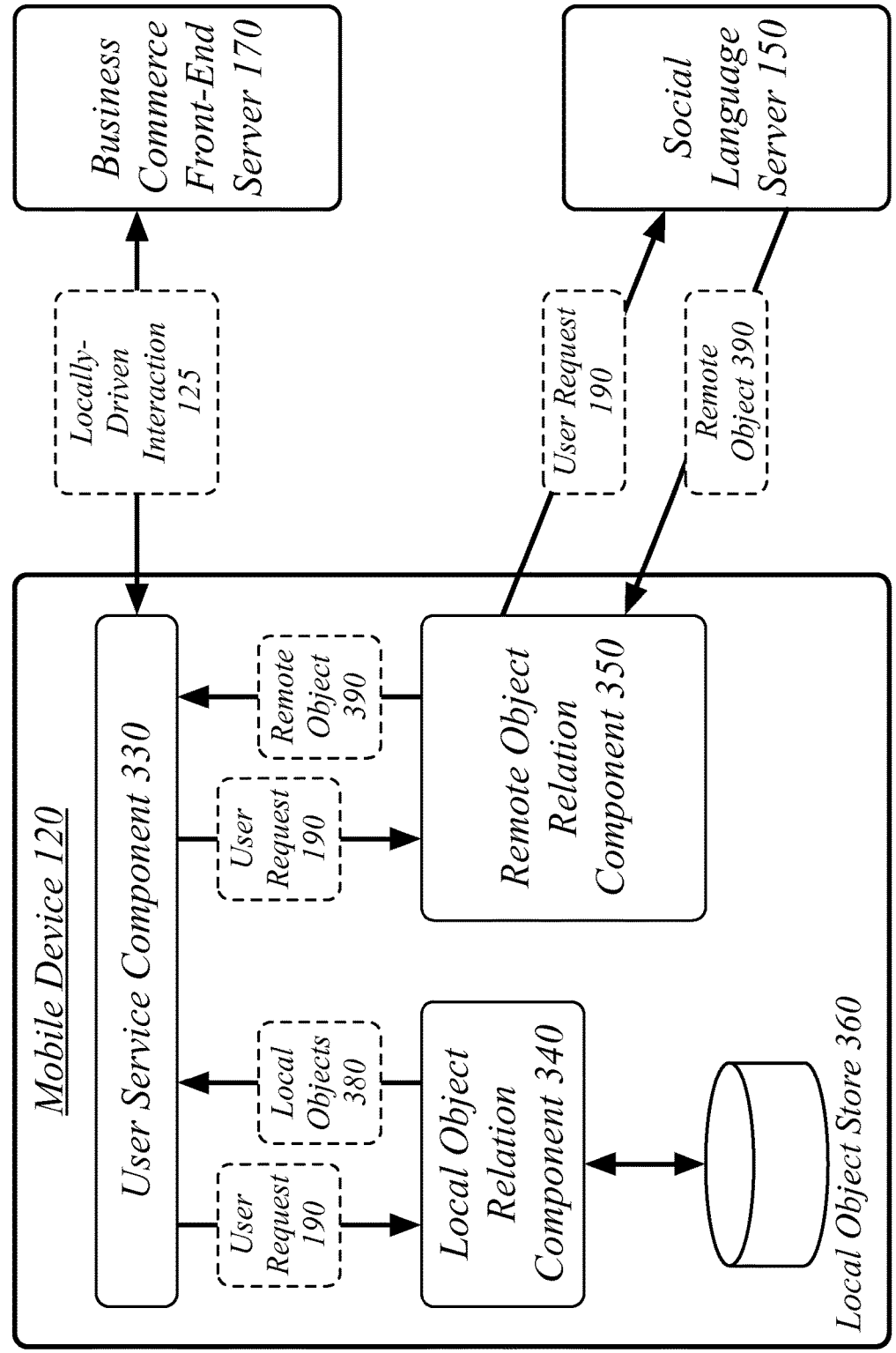
FIG. 3 illustrates an embodiment of a mobile device for natural language requests.

FIG. 3 illustrates an embodiment of a mobile device 120 for natural language requests. The mobile device 120 may comprise a plurality of components. The mobile device 120 may be generally operative to receive natural language user requests and to use object data generated from social-networking interactions to execute the natural language user requests. The mobile device 120 may comprise a user service component 330, a local object relation component 340, and a remote object relation component 350.

The user service component 330 may be operative to receive a natural language user request 190 on a mobile device 120. The natural language user request 190 may be received as a text string, an audio recording, a video recording, or according to any other technique for receiving input from a user. The natural language user request may be entered on a hardware or software keyboard device for the mobile device 120. The natural language user request may be captured by a microphone device for the mobile device 120. The natural language user request may be captured by a camera device for the mobile device 120. The user service component 330 may pass the user request 190 to one or both of a local object relation component 340 and a remote object relation component 350.

The natural language user request 190 may be received by a messaging program executing on the mobile device 120. The messaging program may be a general messaging program, such as a messaging program for a social-networking service. The messaging program may include user-to-user messaging functionality in which two or more users engage in a person-to-person conversation. The messaging program may include consumer-to-business messaging functionality in which a user may message with an automated or human representative for a business. A natural language user request 190 may be detected in either of user-to-user or consumer-to-business messaging.

User-to-user messaging may include implicit prompts for a user request 190. For instance, a first user may comment to a second user that they can make a restaurant reservation, order movie tickets, or otherwise initiate a commercial transaction. The user service component 330 may detect an implicit prompt and offer to carry out the implicit user request 190 to one or both of the users. The user service component 130 may determine at least some of the participants in a service based on the participants in a user-to-user messaging conversation in which an implicit user request 190 is detected. Information known about the participants in a messaging conversation may be used in the configuration of fulfilling a user request 190. For example, user preferences inferred about or explicitly stated by any of the participants may be used in the selection of a service provider. The confidence in a selection of a type of service, service provider (e.g., business), or any other element of fulfilling a request may be determined based on not only its association with the requesting user but on its association with other participants in a messaging conversation.

In some embodiments, consumer-to-business messaging functionality may be performed through a general request-entry interface in which the business being contacted is determined automatically by the natural language request system 100 as part of fulfilling the request. A general request-entry interface may change over to consumer-to-business messaging engaged as part of fulfilling a user request 190. For instance, a user may request a doctor's appointment, an initial stage of requesting an appointment may be performed automatically by the natural language request system 100, and then the user may be placed into a messaging conversation with a representative for a selected doctor's office in order to carry out additional elements of making an appointment.

In some cases, a consumer may select a business by engaging in a messaging conversation with an automated or human representative for the business. The user may select a favorite business, a liked business, search for a business, browse a list of businesses, or otherwise determine a business. The user may select to message with the business. A natural language user request 190 may be detected in the messaging with the business. The natural language user request 190 may be initiated and performed with the business, with the business that the user selected for messaging being automatically selected to fulfill the user request 190 based on the user's initiation of consumer-to-business messaging.

The local object relation component 340 may relate the natural language user request 190 to one or more local objects 380, the one or more local objects stored on the mobile device 120. The local objects 380 may be stored in a local object store 360 local to the mobile device, the local objects 380 stored on the mobile device 120 prior to the reception of the user request 190 and not retrieved and stored in response to the user request 190. The local object store 360 may comprise, at least in part, a cache of objects from an object graph 200 of a social-networking system. One or more of the local objects 380 may comprise cached objects from the object graph 200. The local object store 360 may also store objects not represented in the object graph 200 and one or more of the local objects 380 may comprise objects from the object store 360 not represented in the object graph 200. One or more of the local objects 380 may be retrieved from other sources on the mobile device 120 other than the local object store 360. For example, an object indicating a current location for the mobile device 120 (thereby inferring a location for the user of the mobile device 120) may be retrieved from a geolocation component of the mobile device 120, the geolocation component using one or more of global positioning system (GPS) detection, Wi-Fi detection, cell site detection, Bluetooth detection, or any other technique for detecting a device's location.

The local objects 380 may be retrieved or generated based on local data stored on the mobile device 120. Local data may include a contact list of other repository of names on the mobile device 120. For example, a word or words that can be recognized as a proper noun or name may be matched against the contact list or other repository of names on the mobile device 120. Similarly, other information in a contact list may be used in identifying entities, such as where a phone number is specified in both the user request 190 and the contact list. Further, an association between an entry in a contact list and an object in the object graph 200 may be confirmed or strengthened based on a common phone number being assigned to both. Proper nouns may be matched against geographically-located entity and place names, particularly geographically-located entity and place numbers geographically proximate to the current location of the mobile device 120. Local data may include recent searches performed on the mobile device 120.

The local object relation component 340 may determine a confidence level for each of the one or more local objects 380. The confidence level for an object may represent a degree of confidence that the object corresponds to the natural language meaning of a user request and that the object corresponds to the user's intent for the user request. A confidence level may be represented as a integer or real number. A confidence level may be represented as a probability, the probability indicating a predicted likelihood of accuracy.

For example, a user request based on the text input that they "need a cab ride from here to the mall," may assign an object representing the user's current location to a token based on 'here" and may assign an object representing one mall of a plurality of malls to a token based on "the mall." The particular mall may be selected according to one or more of, including a combination of, the user's location, a location history for the user indicating one or more malls the user has visited, user associations with malls and/or stores in an object graph, and other information related to which mall a user would consider "the mall." The local object relation component 340 may determine that the word "here" is strongly correlated with a user's current location and therefore has a high confidence level. The local object relation component 340 may determine the words "the mall" corresponds to a service token of "malls" with a high degree of confidence, but that due to little information or conflicting information about which specific mall is being referred to, the attachment of a specific object corresponding to a specific mall has a low confidence level.

The natural language request system 100 may have a defined confidence threshold distinguishing between objects assignments that are sufficiently confident to rely on an object relationship determined based on information local to the mobile device 120 and object assignments that are insufficiently confident to rely on such an object relationship. The local object relation component 340 may determine a low-confidence local object of the one or more local objects 380, wherein the confidence level for the low-confidence local object is less than the defined confidence threshold. The low-confidence local object having a confidence level less than the confidence threshold may indicate that the natural language request system 100 will expand the search for objects to relate to the user request 190 to include resources stored remotely from the mobile device 120, such as on a social language server 150 having access to the object graph for a social-networking service.

The remote object relation component 350 may transmit a network query to a network system, the network query requesting that the network system match the natural language user request 190 against an object graph 200. The network query may comprise the user request 190. The remote object relation component 350 may receive a remote object 390 to replace the low-confidence local object from the network system in response to the network query. The remote object 390 may be represented within the object graph 200 for a social-networking service. The network system may comprise a social-networking system executing a social-networking service, with the object graph 200 comprised at least in part of interlinked social-networking objects.

The object graph 200 may comprise token mappings for objects within the object graph, wherein a token mapping defines a relationship between natural language words, a semantic understanding of those words, and objects that correlate with one or both of the natural language words and the semantic understanding of those words. The token mappings may be based on data extracted from a plurality of interactions of users of the network system, wherein the remote object 390 is matched with the natural language user request 190 based on the token mappings. The token mappings may be generated based on a frequency with which the plurality of users associate tokens with the objects in the plurality of interactions. The plurality of interactions may comprise a plurality of natural language user requests from the plurality of users to the network system.

The token mappings may be generated based on a success rate for executions of the plurality of natural language user requests. The success rate may be based on an explicit reporting by users of the network system as to their satisfaction with the executions of the requests. The success rate may be based on the explicit behavior of a user in accepting or rejection the proposed execution of the user request, such as where the user service component 330 displays a proposed execution strategy to the user prior to execution and only executes the proposed execution strategy if the user approves. The success rate may be based on an implicit evaluation of user satisfaction with the executions of their requests, which may be based on, without limitation: repeated use by the users of the language of the natural language requests, repeated use by the users of the natural language request system 100 for similar requests, and other implication indications of a positive or negative reaction to the execution of a user request 190. The success rate may similarly be based on explicit or implicit signals from businesses as to their satisfaction with being used for the execution of the user request 190.

The token mappings may be based on bidding by business entities for associations between tokens and their business. For example, a restaurant reservation service may bid to be associated with tokens such as "table," "reservation," "dinner," "eat," and other tokens related to the purchase and consumption of food. The natural language request system 100 may be operative to determine its confidence in the association between an object for a business entity and a token based at least in part on an amount bid by the business entity for that association. As businesses learn, based on their experience with the natural language request system 100, what tokens best guide users to their business, they may bid higher on those tokens and thereby improve the accuracy of the natural language request system 100.

The user service component 330 may then execute the natural language user request 190 based on the remote object 390. One or more of the local objects 380 may also be used in the execution of the user request 190. One or more additional remote objects received from the social language server 150 may also be used in the execution of the user request 190.

Executing the user request 190 may include interacting with a business entity. The remote object 390 received from the social language server 150 may correspond to a business entity represented in the object graph 200. The remote object 390 for the business entity may include automated interaction instructions for the business entity. Automated interaction instructions may comprise procedures, APIs, network addresses, formats, and other information for automated computerized request performance with a business commerce front-end server 170 for the business entity.

The user service component 330 may receive the automated interaction instructions and execute the natural language user request 190 by performing at least one of a purchase and a reservation with a network server for the business entity based on the received automated interaction instructions. The user service component 330 may engage in a locally-driven interaction 125 with the business commerce front-end server 170, the locally-driven interaction 125 involving direct communication between the mobile device 120 and the business commerce front-end server 170 for the business entity.

In some cases, the natural language request system 100 may be able to execute the user request 190 without the use of an external business entity. Where the natural language request system 100 includes messaging functionality and/or social-networking functionality, the user request 190 may be fulfilled through the performance of messaging services and/or social-networking services. For instance, user interest in having an image, video, sticker, or other element included in their messaging conversation may be detected based on a natural language user request 190 and the execution of the user request 190 may comprise the inclusion of this element. In some cases, an image, sticker, or other element may be selected and suggested based on a correspondence between the text of a user's conversation and the element, such as suggesting a sticker that illustrates the mood of the text. The text of a conversation may therefore comprise the natural language user request 190.

Similarly, user interest in having a social-networking task performed may be detected based on a natural language user request 190 and the execution of the user request 190 may comprise the performance of the social-networking tasks. Social-networking tasks may include making posts to a social-networking service, liking a post on a social-networking service, uploading media to a social-networking service, tagging a user as present at an event, location, or business, or any other social-networking activity.

Additional objects associated with the user request 190, including one or more of the local objects 380 and/or one or more additional remote objects, may be used in executing the user request 190. The additional objects may define information used in configuring the automated interaction instructions and may define information used in selecting options allowed by the automated interaction procedures performed using the automated interaction instructions. For example, the automated interaction procedures for a taxi company may allow the specification of a desired time of pickup, a pickup location, and a drop-off location. The object for the taxi company may define the automated interaction instructions for contacting the business commerce front-end server 170. Those automated interaction instructions may indicate that a desired time of pickup, a pickup location, and a drop-off location may be specified—in some cases, they may specify that one or more of the configuration options, such as a drop-off location, may be optional and specified in-person to the driver at time of pickup. Objects generated from the user request 190 determined to relate to the time of pickup, a pickup location, and a drop-off location may therefore be used specify those options. In some cases, an object may be determined implicitly based on a lack of an explicit statement in a user request. For example, a pickup time of "now" or "as soon as possible" may be inferred when a ride is requested without an explicit specification of a pickup time.

Both the execution of a user request 190 and the mapping between the language of a user request 190 and objects may be based on the location of the mobile device 120. The user service component 330 may determine a current location of the mobile device 120. The user service component 330 may execute the natural language user request 190 based on the remote object 390 and the current location of the mobile device 120, such as through configuration of a locally-driven interaction 125 with a business commerce front-end server 170 in which one or more options of the locally-driven interaction 125 include or are derived from the current location of the mobile device 120. The user service component 330 may, alternatively, transmit the current location of the mobile device 120 to the network system (e.g., the social language server 150) where the received remote object 390 selected from the plurality of objects of the object graph 200 was based on a proximity to the determined current location. For example, a service may be performed by a variety of different service providers, with the specific service provider selected based at least in part on their being geographically close to the current location of the mobile device 120.

Figure 4:
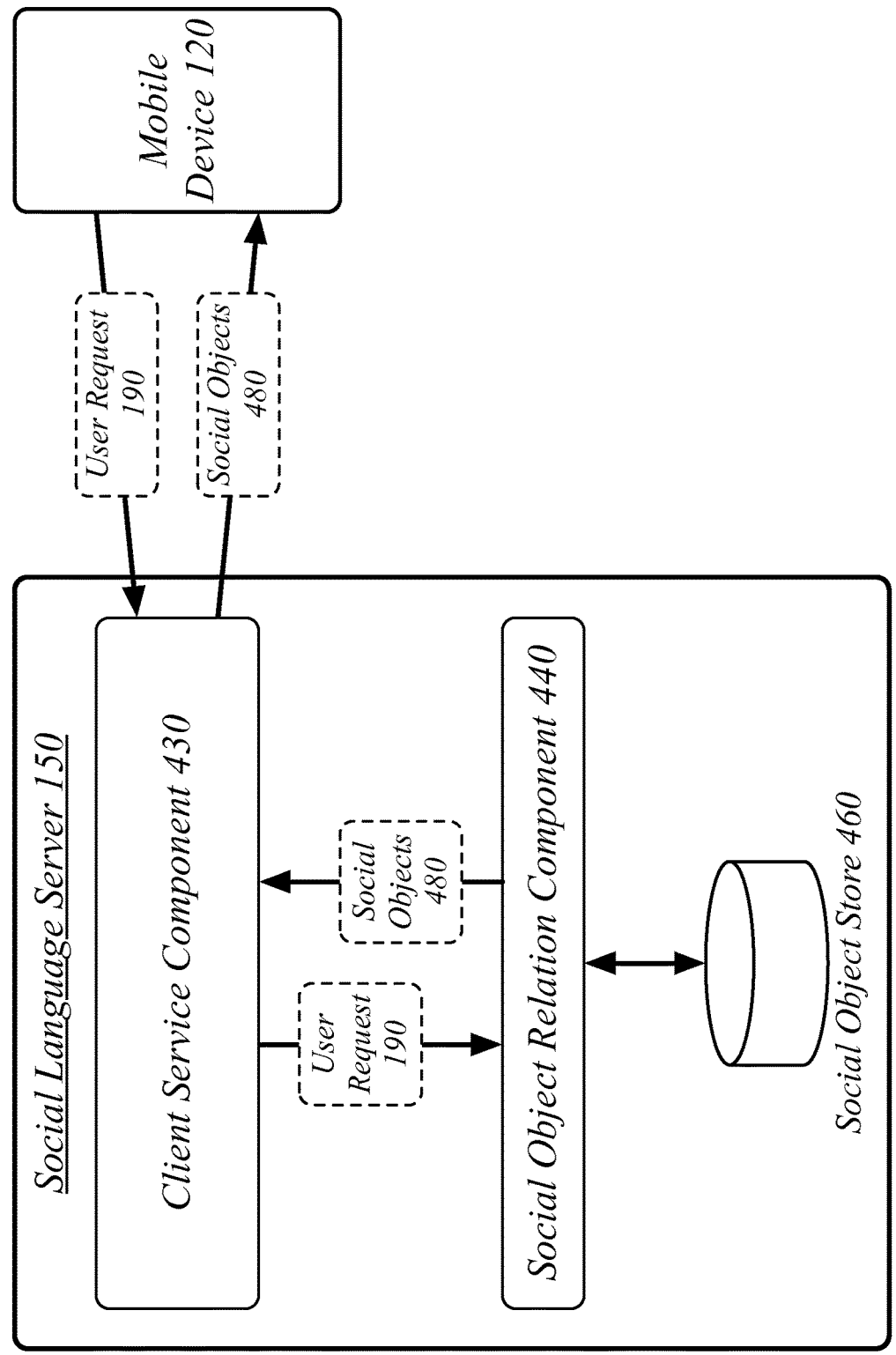
FIG. 4 illustrates an embodiment of a social language server retrieving social objects for a mobile device.

FIG. 4 illustrates an embodiment of a social language server 150 retrieving social objects 480 for a mobile device 120. The social language server 150 may be operative to analyze natural language user requests on behalf of members of a social-networking service using information derived from interactions within the social-networking service. The social language server 150 may comprise a client service component 430 and a social object relation component 440.

The client service component 430 may receive a natural language user request 190 from a mobile device 120. The client service component 430 may receive the user request 190 in a same form that it was received by the user service component 330 of the mobile device 120 or may receive the user request 190 in a transformed format. For example, a user request 190 received as audio may be transcribed to text prior to transmission to the client service component 430. The natural language user request 190 may be received from the mobile device 120 in response to the mobile device 120 performing object matching to local data on the mobile device 120 and determining that the object matching generated at least one client-matched object with a confidence level below a confidence threshold.

The social object relation component 440 may match the natural language user request 190 to one or more social objects 480 in an object graph 200, the object graph 200 comprising token mappings for objects within the object graph 200, the token mappings based on data extracted from a plurality of interactions by a plurality of users of the network system, wherein the one or more objects are matched with the natural language user request 190 based on the token mappings. In general, the matching of the natural language user request 190 by the social object relation component 440 may correspond to the procedures of the matching of the user request 190 performed by the local object relation component 340 of the mobile device 120, but with access to the additional data of a larger social object store 460 rather than the more limited resources of the local object store 360.

The client service component 330 may thereafter transmit the social objects 480 to the mobile device 120. The execution of the user request 190 may comprise this transmission of the matched one or more social objects 480 to the mobile device 120 for execution of the user request 190 by the mobile device 120. The social objects 480 may therefore correspond to the remote object 390 received by the user service component 330 of the mobile device 120. The social language server 150 may be an element of a social-networking service. The natural language user request 190 may be received at a social-networking system for the social-networking service. The object graph 200 may therefore comprise a graph comprised at least in part of interlinked social-networking objects. The social-networking system may comprise the network system. The token mappings may be generated based on a frequency with which the plurality of users associated token with the social objects 480 in the plurality of interactions. This plurality of interactions may comprise a plurality of natural language user requests from the plurality of users to the network system, with the token mappings generated based on a success rate for executions of the plurality of natural language user requests 190.

The social language server 150 may use a current location of the mobile device 120 in the determination of the social objects 480. The client service component 430 may receive the current location of the mobile device 120 from the mobile device 120 and select the matched one or more social objects 480 based on a proximity to a current location of the mobile device 120. For instance, the social objects 480 may be selected based on a proximity between the received current location and an address for a business entity recorded in the social object for the business entity.

Figure 5:
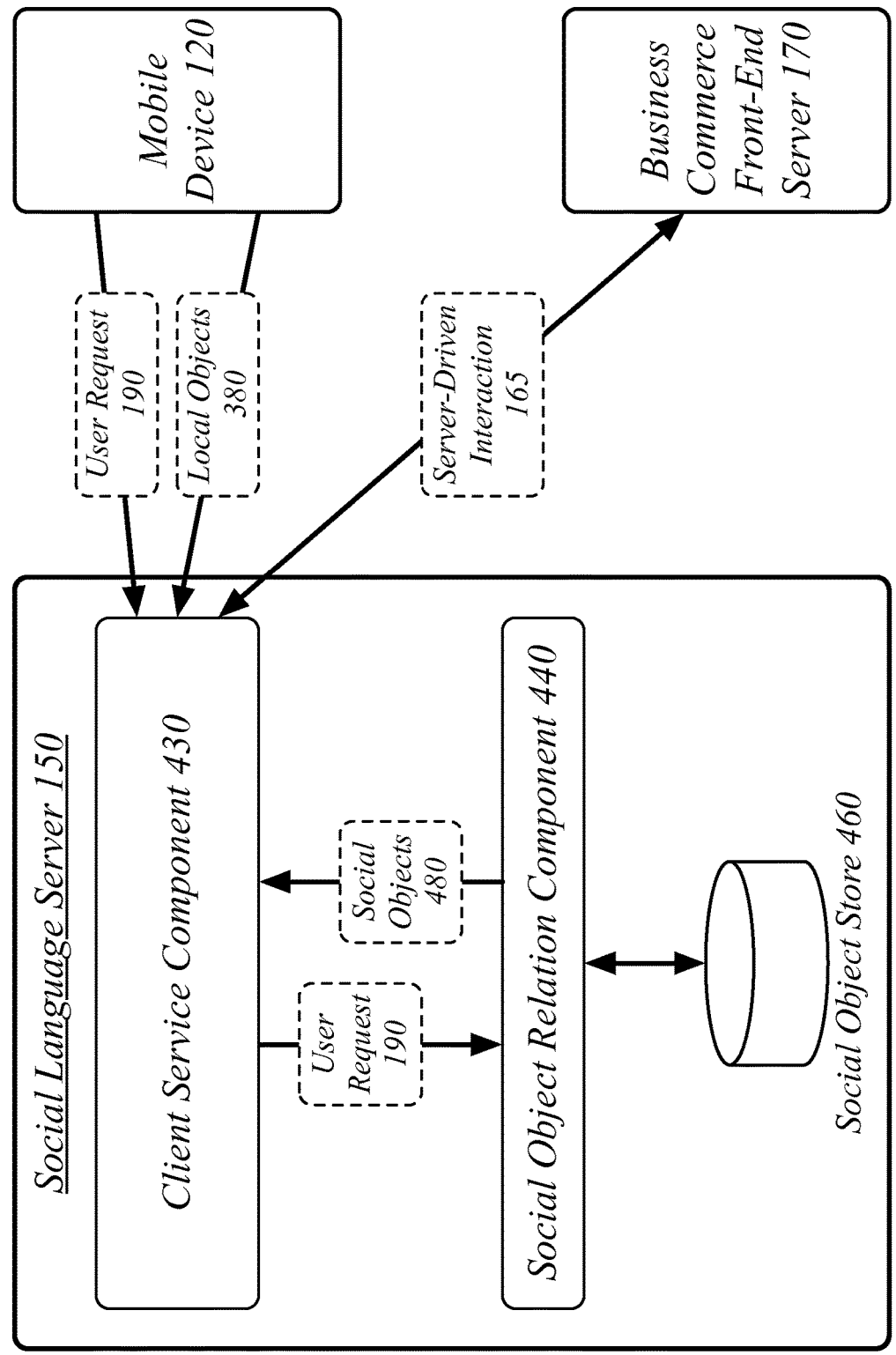
FIG. 5 illustrates an embodiment of a social language server performing commerce for a mobile device.

FIG. 5 illustrates an embodiment of a social language server 150 performing commerce for a mobile device 120. The social language server 150 may be operative to perform natural language user requests on behalf of members of a social-networking service in addition to analyzing the user requests.

As an alternative to returning the social objects 480 to the mobile device 120 for the execution of a locally-driven interaction 125, the client service component 330 may execute the natural language user request 190 based on the matched one or more social objects 480 in a server-driven interaction 165. The social language server 150 may perform the server-driven interaction 165 with the business commerce front-end server 170 on behalf of the mobile device 120 in order to conserve the processing, bandwidth and energy resources of the mobile device 120. Where the user request 190 will be performed via a server-driven interaction 165, the client service component 430 may receive one or more local objects 380 from the mobile device 120 and use the local objects 380 in the execution of the user request 190.

The social language server 150 may use a current location of the mobile device 120 in the performance of the user request 190. The current location may comprise one of the local objects 380 received from the mobile device 120. The client service component 430 may receive the current location of the mobile device 120 from the mobile device 120 and execute the natural language user request 190 based on the matched one or more social objects 480 and the current location of the mobile device 120.

The matched one or more social objects 480 may include a business object corresponding to a business entity, the business object represented in the object graph 200. The client service component 430 may retrieve automated interaction instructions for the business entity based on the business. In some cases, the automated interaction instructions may be stored within the business object. The client service component 430 may execute the natural language user request 190 by performing at least one of a purchase and a reservation with the business commerce front-end server 170 for the business entity based on the retrieved automated interaction instructions, the performance of the purchase and/or reservation comprising the server-driven interaction 165.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a first logic flow 600. The logic flow 600 may be representative of some or all of the operations executed by one or more embodiments described herein.

In the illustrated embodiment shown in FIG. 6, the logic flow 600 may receive a natural language user request 190 on a mobile device 120 at block 602.

The logic flow 600 may relate the natural language user request 190 to one or more local objects 380, the local objects 380 stored on the mobile device 120 at block 604.

The logic flow 600 may determine a confidence level for each of the one or more local objects 380 at block 606.

The logic flow 600 may determine a low-confidence local object, wherein the confidence level for the low-confidence local object is less than a confidence threshold at block 608.

The logic flow 600 may transmit a network query to a network system, the network query requesting that the network system match the natural language user request 190 against an object graph 200 at block 610.

The logic flow 600 may receive a remote object 390 to replace the low-confidence local object from the network system in response to the network query, the remote object 390 represented within the object graph 200 at block 612.

The logic flow 600 may execute the natural language user request 190 based on the remote object 390 at block 614.

The embodiments are not limited to this example.

FIG. 7 illustrates one embodiment of a second logic flow 700. The logic flow 700 may be representative of some or all of the operations executed by one or more embodiments described herein.

In the illustrated embodiment shown in FIG. 7, the logic flow 700 may receive a natural language user request 190 from a mobile device 120 at block 702.

The logic flow 700 may match the natural language user request 190 to one or more social objects 480 in an object graph 200, the object graph 200 comprising token mappings for social objects 480 within the object graph 200, the token mappings based on data extracted from a plurality of interactions by a plurality of users of the network system, wherein the one or more social objects 480 are matched with the natural language user request 190 based on the token mappings at block 704.

The logic flow 700 may execute the natural language user request 190 based on the matched one or more social objects 480 at block 706.

The embodiments are not limited to this example.

Figure 8:
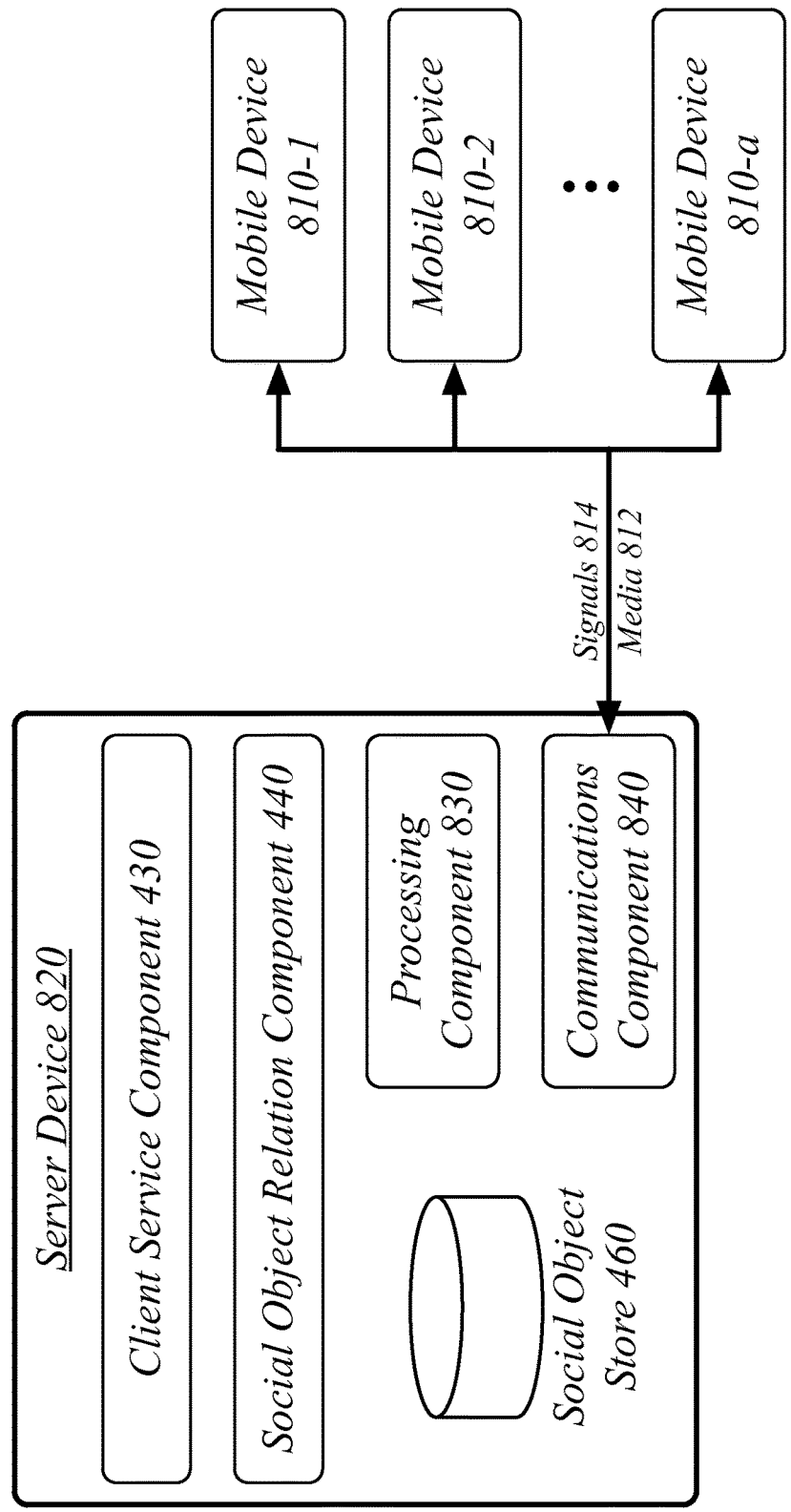
FIG. 8 illustrates an embodiment of a centralized system for the system of FIG. 1.

FIG. 8 illustrates a block diagram of a centralized system 800. The centralized system 800 may implement some or all of the structure and/or operations for the natural language request system 100 in a single computing entity, such as entirely within a single device 820.

The device 820 may comprise any electronic device capable of receiving, processing, and sending information for the natural language request system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the natural language request system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the natural language request system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with mobile devices 810 over a communications media 812 using communications signals 814 via the communications component 840. The plurality of mobile devices 810 may comprise devices used by users of the natural language request system 100 and/or the social-networking service. The signals 814 transmitted over the media 812 may correspond to the transmission of user requests to the client service component 430 and the transmission of social objects to the mobile devices 810.

Figure 9:
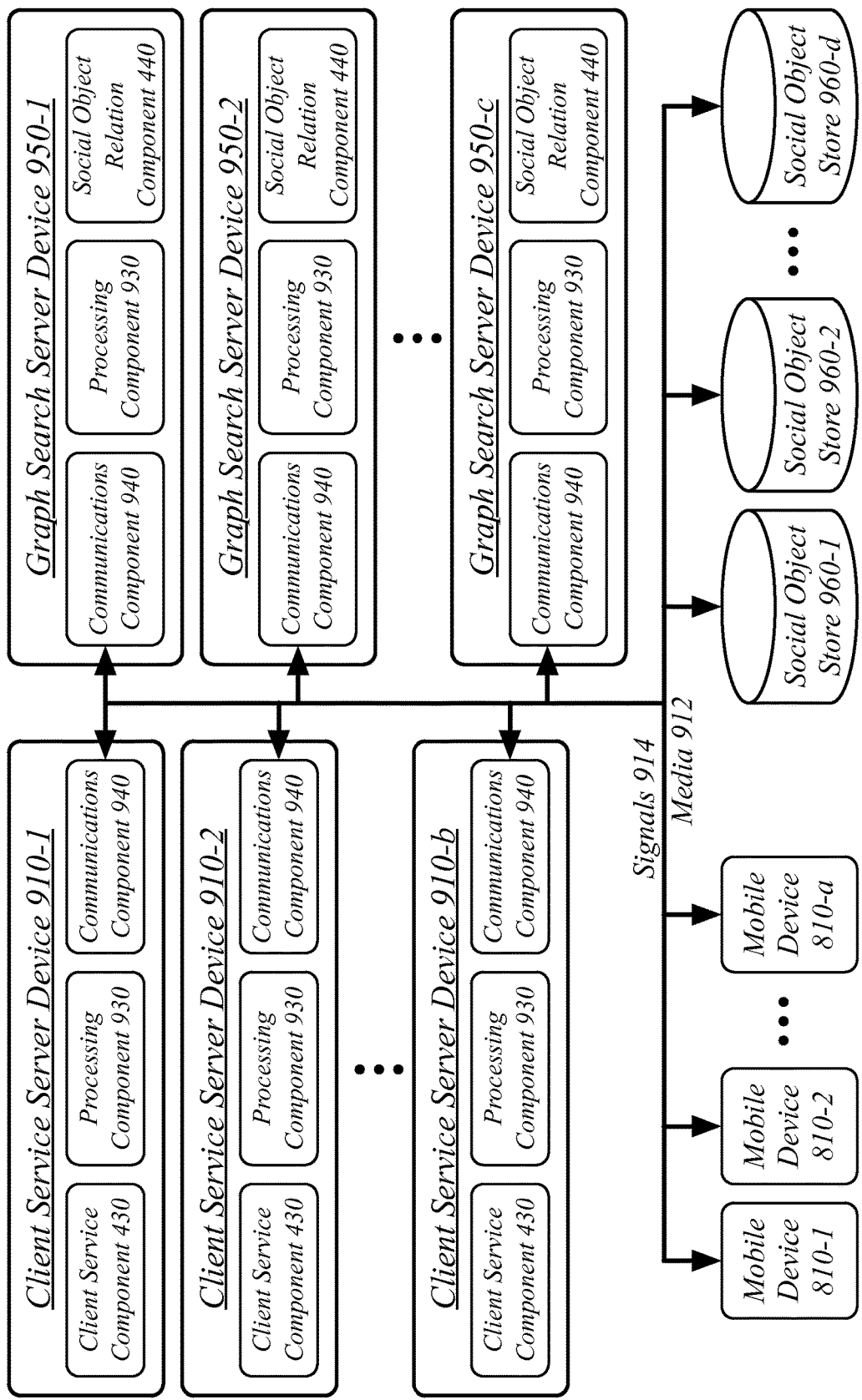
FIG. 9 illustrates an embodiment of a distributed system for the system of FIG. 1.

FIG. 9 illustrates a block diagram of a distributed system 900. The distributed system 900 may distribute portions of the structure and/or operations for the natural language request system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client service server devices 910 and a graph search server devices 950. In general, the client service server devices 910 and the graph search server devices 950 may be the same or similar to the server device 820 as described with reference to FIG. 8. For instance, the server devices 910, 950 may each comprise a processing component 930 and a communications component 940 which are the same or similar to the processing component 830 and the communications component 840, respectively, as described with reference to FIG. 8. In another example, the server devices 910, 950 may communicate over a communications media 912 using communications signals 914 via the communications components 940.

The client service server devices 910 may comprise or employ one or more client programs that operate to perform various methodologies in accordance with the described embodiments. In one embodiment, for example, the client service server devices 910 may implement a plurality of client service components 430.

The graph search server devices 950 may comprise or employ one or more server programs that operate to perform various methodologies in accordance with the described embodiments. In one embodiment, for example, the graph search server devices 950 may implement a plurality of social object relation components 440.

The server devices 910, 950 may communicate with the mobile devices 810 using signals 914 transmitted over media 912. The object graph 200 may be stored in a plurality of social object stores 960, the social object stores 960 comprising a distributed database storing the object graph 200. The server devices 910, 950 may communicate with the social object stores 960 using signals 914 transmitted over media 912.

Figure 10:
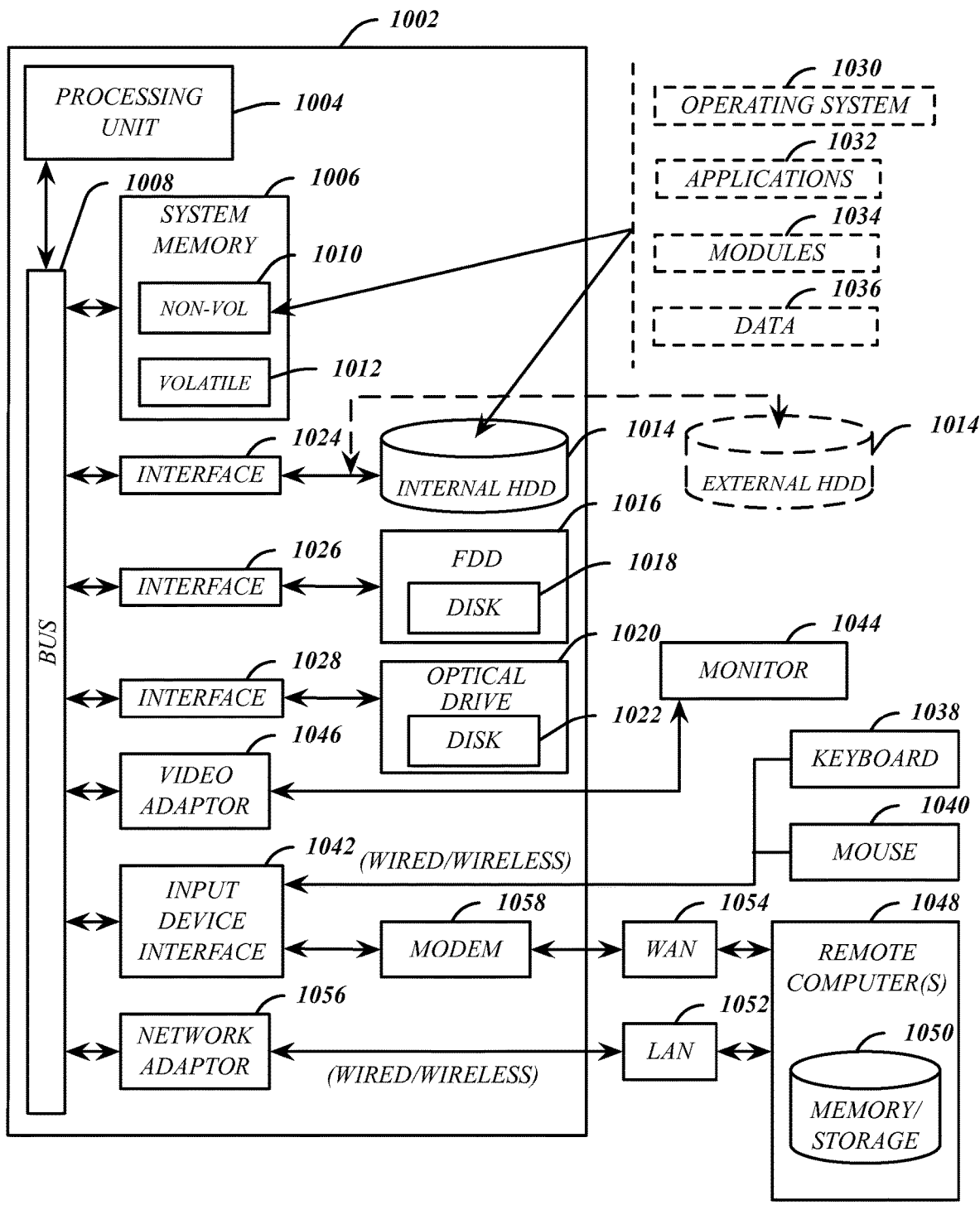
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the natural language request system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server devices 910, 950. The clients 1102 and the servers 1104 are operatively connected to one or more respective client data stores 1108 and server data stores 1110 that can be employed to store information local to the respective clients 1102 and servers 1104, such as cookies and/or associated contextual information. The clients 1102 may implement mobile devices 810 including mobile device 120.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
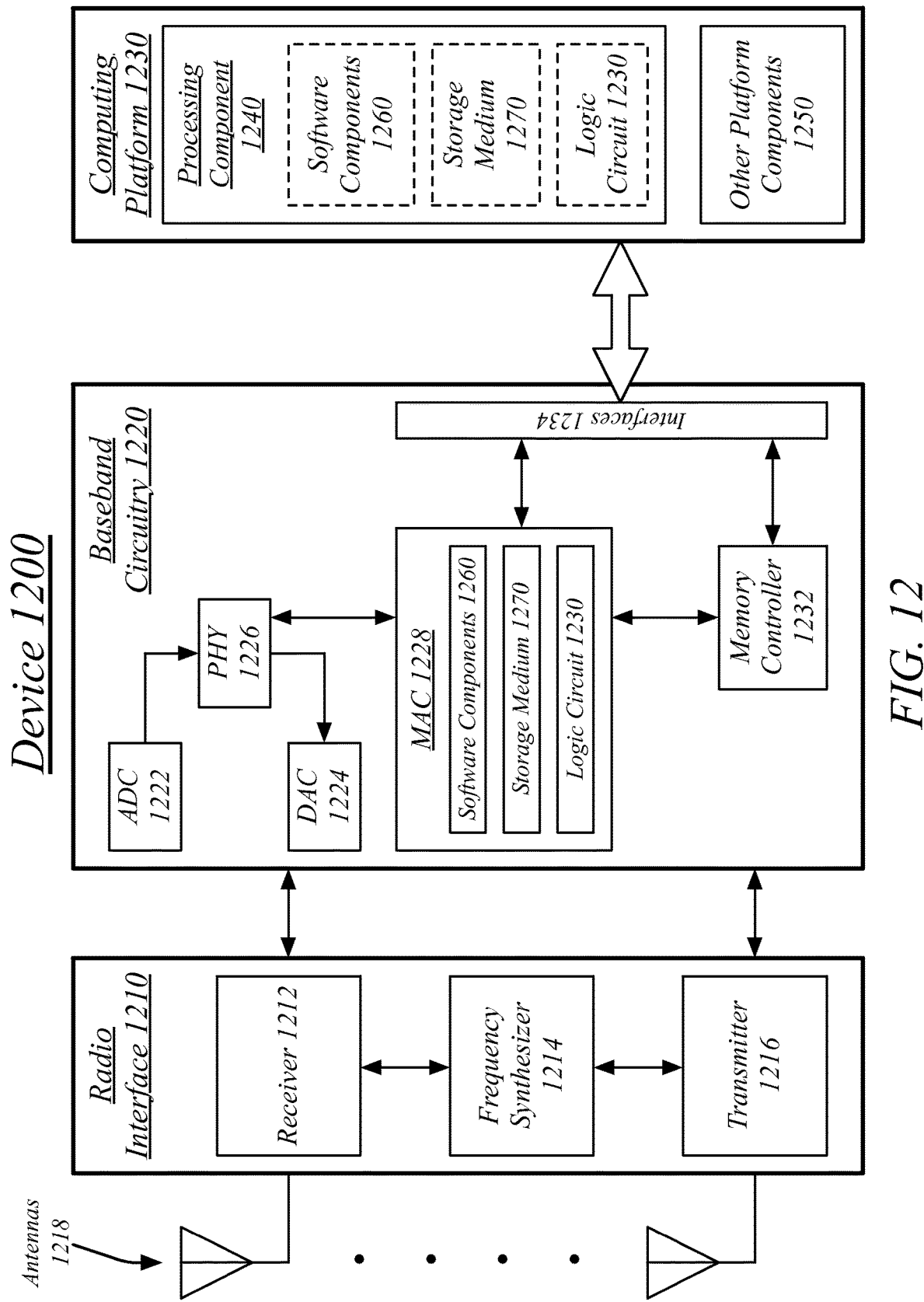
FIG. 12 illustrates an embodiment of a radio device architecture.

FIG. 12 illustrates an embodiment of a device 1200 for use in a multicarrier OFDM system, such as the natural language request system 100. Device 1200 may implement, for example, software components 1260 as described with reference to natural language request system 100 and/or a logic circuit 1230. The device 1200 may correspond to the mobile device 120 and/or one or more of the mobile devices 810. The logic circuit 1230 may include physical circuits to perform operations described for the natural language request system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the natural language request system 100 and/or logic circuit 1230 in a single computing entity, such as entirely within a single device. Alternatively, the device 1200 may distribute portions of the structure and/or operations for the natural language request system 100 and/or logic circuit 1230 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the natural language request system 100 and logic circuit 1230 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a natural language user request;
   matching the natural language user request to one or more objects in an object graph, the object graph comprising a plurality of nodes interconnected by edges, the nodes representing related entities and the edges between the nodes corresponding to relationships between the entities;
   inferring, based on the matched at least one object, natural language associated with the matched at least one object;

using the inferred associated natural language to interpret the natural language user request;

based on the interpreting, generating an execution strategy responsive to the natural language user request; and store the generated execution strategy in a memory.

2. The method of claim 1, the object graph comprising one or more token mappings matching one or more objects in the object graph, the natural language user request matched to the one or more objects based on the one or more token mappings.

3. The method of claim 2, wherein the token mappings are generated based on a frequency with which a plurality of users associate tokens with the objects in a plurality of interactions.

4. The method of claim 2, wherein the token mappings are generated based on a success rate for executions of a plurality of natural language user requests by a plurality of users of the network system.

5. The method of claim 2, wherein the token mappings represent at least one of: a relationship between natural language words, a semantic understanding between the natural language words, or a correlation between the natural language words and the semantic understanding.

6. The method of claim 1, further comprising executing the natural language user request based on the matched one or more objects in the object graph.

7. The method of claim 1, the natural language user request mapped to one or more local objects stored in a locally cached version of the object graph.

8. At least one non-transitory computer-readable storage medium comprising instructions that, when executed, cause a system to:

receive a natural language user request;

match the natural language user request to one or more objects in an object graph, the object graph comprising a plurality of nodes interconnected by edges, the nodes representing related entities and the edges between the nodes corresponding to relationships between the entities;

infer, based on the matched at least one object, natural language associated with the matched at least one object;

use the inferred associated natural language to interpret the natural language user request;

based on the interpreting, generate an execution strategy responsive to the natural language user request; and store the generated execution strategy in a memory.

9. The medium of claim 8, the object graph comprising one or more token mappings matching one or more objects in the object graph, the natural language user request matched to the one or more objects based on the one or more token mappings.

10. The medium of claim 9, wherein the token mappings are generated based on a frequency with which a plurality of users associate tokens with the objects in a plurality of interactions.

11. The medium of claim 9, wherein the token mappings are generated based on a success rate for executions of a plurality of natural language user requests by a plurality of users of the network system.

12. The medium of claim 9, wherein the token mappings represent at least one of: a relationship between natural language words, a semantic understanding between the natural language words, or a correlation between the natural language words and the semantic understanding.

13. The medium of claim 8, further storing instructions for executing the natural language user request based on the matched one or more objects in the object graph.

14. The medium of claim 8, the natural language user request mapped to one or more local objects stored in a locally cached version of the object graph.

15. An apparatus, comprising:

a processor circuit on a device;

a client service component operative on the processor circuit to receive a natural language user request;

a social object relation component operative on the processor circuit to match the natural language user request to one or more objects in an object graph, the object graph comprising a plurality of nodes interconnected by edges, the nodes representing related entities and the edges between the nodes corresponding to relationships between the entities; and digital logic configured to:

infer, based on the matched at least one object, natural language associated with the matched at least one object;

use the inferred associated natural language to interpret the natural language user request;

based on the interpreting, generate an execution strategy responsive to the natural language user request; and execute the generated execution strategy.

16. The apparatus of claim 15, the object graph comprising one or more token mappings matching one or more objects in the object graph, the natural language user request matched to the one or more objects based on the one or more token mappings.

17. The apparatus of claim 16, wherein the token mappings are generated based on a frequency with which a plurality of users associate tokens with the objects in a plurality of interactions.

18. The apparatus of claim 16, wherein the token mappings are generated based on a success rate for executions of a plurality of natural language user requests by a plurality of users of the network system.

19. The apparatus of claim 16, wherein the token mappings represent at least one of: a relationship between natural language words, a semantic understanding between the natural language words, or a correlation between the natural language words and the semantic understanding.

20. The apparatus of claim 15, the natural language user request mapped to one or more local objects stored in a locally cached version of the object graph.

* * * * *